(12) United States Patent
Verros

(10) Patent No.: US 6,905,175 B1
(45) Date of Patent: Jun. 14, 2005

(54) BIDIRECTIONAL SIDE DUMP TRAILER WITH IMPROVED TUB LIFT SYSTEM

(75) Inventor: James M. Verros, Elk Point, SD (US)

(73) Assignee: SmithCo Mfg., Inc., LeMars, IA (US)

( * ) Notice: Subject to any disclaimer, the term of this patent is extended or adjusted under 35 U.S.C. 154(b) by 0 days.

(21) Appl. No.: 10/678,627

(22) Filed: Oct. 6, 2003

(51) Int. Cl.[7] .................................................. B60P 1/16
(52) U.S. Cl. ........................ 298/17.7; 298/22 P; 298/18
(58) Field of Search .......................... 298/17.7, 17 R, 298/17.5, 17.6, 18, 19 R, 22 R, 22 C, 22 P

(56) References Cited

U.S. PATENT DOCUMENTS

| | | | |
|---|---|---|---|
| 1,392,107 A | * | 9/1921 | Berry ........................ 298/17.7 |
| 4,200,334 A | * | 4/1980 | Lindholm ...................... 298/7 |
| 5,480,214 A | | 1/1996 | Rogers |
| 5,597,211 A | | 1/1997 | Golden |
| 5,906,417 A | | 5/1999 | Golden |

FOREIGN PATENT DOCUMENTS

| | | | | |
|---|---|---|---|---|
| JP | 355001217 | * | 1/1980 | ............... 298 17.7 |

* cited by examiner

Primary Examiner—H. Gutman
(74) Attorney, Agent, or Firm—G. Brian Pingel; Camille L. Urban

(57) ABSTRACT

A directional side dump trailer having a wheeled frame for supporting a containment tub for receiving material to be dumped, which tub is releasably attached to the frame by locks, and at least a pair of power cylinders secured to the tub and the trailer and located generally below the containment tub.

19 Claims, 6 Drawing Sheets

BIDIRECTIONAL SIDE DUMP TRAILER WITH IMPROVED TUB LIFT SYSTEM

BACKGROUND OF THE INVENTION

1. Field of the Invention

The present invention relates in general to dump trailers having a containment tub that can be emptied from either of its sides rather than from its rear end and more specifically relates to a lift system for the tub that is designed to better distribute pressure being exerted on the tub ends during the dumping process.

2. Description of the Prior Art

Bidirectional side dump trailers that include a pivotally mounted containment tub to permit dumping of a load from either side of a trailer rather than the trailer rear end have been known in the prior art for many years and have achieved acceptance in the marketplace since the early 1990's. Such trailers are particularly useful in situations such as during road construction when it is often necessary to dump numerous large loads of rock or gravel along the sides of roadbeds or for conducting ground leveling activity.

A variety of different types of bidirectional side dump trailers are known in the art. An example of one of the earlier types of side dump trailers used commercially is disclosed in U.S. Pat. No. 5,480,214 issued to Rogers. To provide for pivotal movement of the containment tub for dumping purposes, the Rogers' patent discloses the employment of hydraulic powered cylinders at the front and rear of the tub that when engaged cause the tub to pivot to one side or the other to dump material contained therein.

Although the Rogers' type of lifting system for the trailer tub has proved useful, it suffers from a number of deficiencies. Firstly and most importantly, by having the powered cylinders located at opposite ends of the containment tub, the lifting force applied, is placed upon the ends of the tub body as it is pivoted to one side or another by the cylinders, rather than being distributed along the length of the body. Secondly, the application of pressure on the ends of the containment tub often results in tub corner cracking as a result of the localization of lifting pressure thereon. Thirdly, the Rogers' design does not allow for the use of containment tubs that are longer than the trailer frame and, in many instances, it is beneficial to be able to use longer tubs when the hauling of maximum loads is required.

As an alternative to the Rogers' trailer design, lift systems for the containment tub have been developed that are positioned directly beneath the tub intermediate its end to provide a centrally directly lifting force oh the tub. Two such lift systems are disclosed in U.S. Pat. Nos. 5,906,417 and 5,597,211 issued to Golden.

Each of the Golden embodiments involve a centrally disposed, powered, multi-stage cylinder arrangement that lies beneath the containment tub such that as it is actuated the tub is tilted to one side or the other depending upon the dumping action desired.

Although the embodiments disclosed by Golden seem to eliminate the deficiencies of having end located power cylinders, as pointed out in the '211 patent, in column 10 due to the use of a single connection point between the lift system and the container tub, the stress on the base wall of the containment tub is extreme and requires further structural strength for the tub. The present invention is adapted to provide a bidirectional side dump trailer that avoids the deficiencies of having end mounted power cylinders or that have only a single centrally located lift system.

In view of the foregoing structure, it is an object of the present invention to provide a bidirectional side dump trailer with a lifting mechanism that distributes the lift force over a greater area to allow the associated stresses applied on the container tub to be minimized. Such distribution of the lift force presents the option to use lighter weight material (such as aluminum) in the containment tub ultimately providing greater payloads. It is a further advantage of the present invention to provide a lifting mechanism that requires a relatively low volume of hydraulic fluid for controlling the lift system. It is an additional object of the invention to provide a mechanism that not only allows for the possibility of a greater dump angle for the container tub, but also serves to locate the hydraulic cylinders of the lift mechanism in a location where they are protected beneath the containment tub.

SUMMARY OF THE INVENTION

The present invention provides a bidirectional side dump trailer for hauling material that is suitable for dumping from either side of the trailer. The invention includes a wheeled frame, a containment tub mounted upon tub supports secured to the frame, locking means located on the tub and the trailer for releasable securement of the tub to the trailer and tub lifting means comprised of at least two power cylinders located at a generally medial location underneath the containment tub.

In a preferred embodiment, the power cylinders each have lower ends pivotally secured to a generally medial portion of said trailer and upper ends pivotally secured to the bottom of said containment tub so that the cylinders define a front power cylinder and a rear power cylinder generally in alignment with one another. The wheeled frame includes a plurality of transverse support struts extending between the opposite sides thereof, and the bottom ends of the power cylinders are secured to at least one of the support struts of said frame.

The foregoing and other advantages of the present invention will appear from the following description. In the description, reference is made to the accompanying drawings, which form a part hereof, and in which there is shown by illustration and not of limitation a specific form in which the invention may be embodied. Such embodiment does not represent the full scope of the invention, but rather the invention may be employed in a variety of other embodiments and reference is made to the claims herein for interpreting the breadth of the invention.

DETAILED DESCRIPTION OF THE PREFERRED EMBODIMENT

Figure 1:
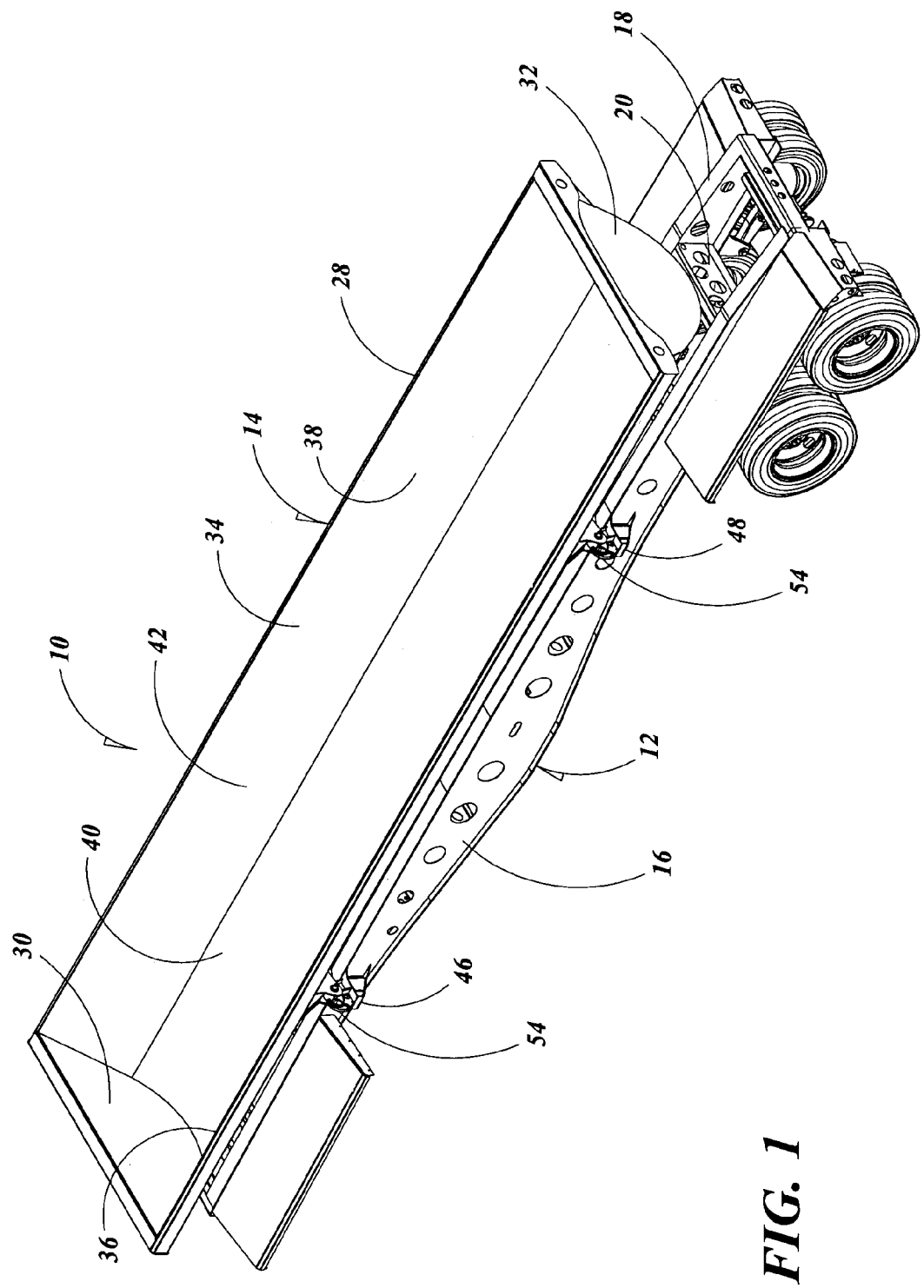
FIG. 1 is a front-side perspective view of a preferred embodiment of the bidirectional side dump trailer of the present invention formed of a trailer and a containment tub.

Referring now to the drawings and with reference first to FIG. 1, a preferred embodiment of the bidirectional side dump trailer of the present invention is shown at 10 that is particularly adapted for hauling rock, dirt, gravel and other types of solid material. The trailer 10 includes a wheeled frame 12 on which is pivotally mounted a containment tub 14. The wheeled frame 12 is formed from two spaced apart main sidewalls 16 and 18 that are secured together by a plurality of transverse support struts 20. Although the frame 12 is depicted as being adapted for being pulled by a truck, it should be understood that the frame 12 could also be part of the truck if desired or towed by farm tractor via a hitch.

The containment tub 14 has an elongated body 28 including a front wall 30, a rear wall 32 and an arcuate shaped trough 34 formed with side portions 36 and 38 and a bottom portion 40. The trailer body 28 has an open top 42 through which materials to be hauled can be loaded into the tub 14. It should be known to those skilled in the art that although the tub 14 is illustrated with an arcuate body portion, a variety of different types of containment tub shapes are known and are available in the marketplace. Consequently, the specific configuration of the tub 14 is not a critical element of the present invention.

Figure 5:
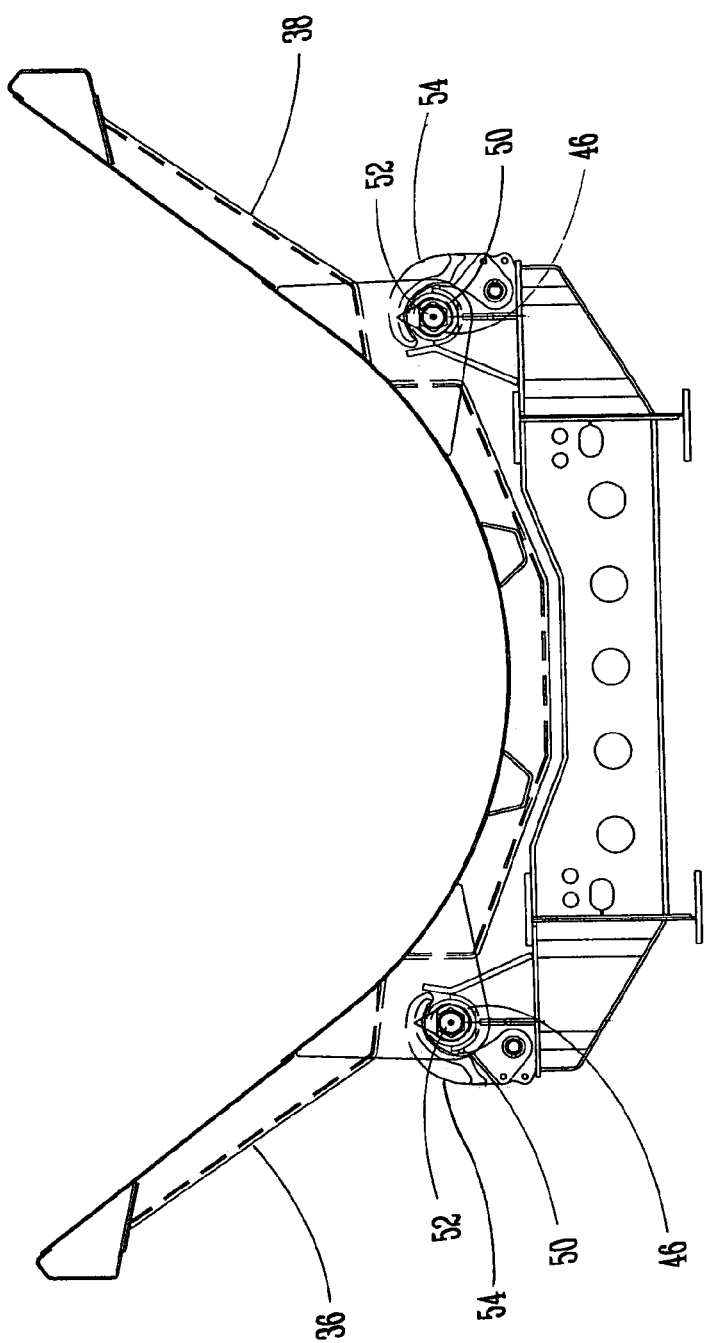
FIG. 5 is a cross-sectional view taken through the line 5—5 of FIG. 3.

The containment tub 14 is supported on the trailer frame 12 by front and rear pairs of saddle assemblies 46 and 48 respectively that serve as forward and rear tub supports. Referring now to FIG. 5, each of the saddle assemblies 46 and 48 is formed with a cradle member 50 secured to the frame 12 in alignment with locking pins 52 mounted on the side portions 36 and 38 of the trailer body trough 34. The locking pins 52 are sized for being received within the cradle members 50 when the tub 14 is supported upon the frame 12.

The saddle assemblies 46 and 48 further include arcuately shaped locking figures 45, as best shown in FIG. 5, that are adapted to be pivotally mounted on the cradles 50 in such fashion that when they are in a closed position, they overlie the locking pins 52 to secure the tub 14 to the frame 12 and when they are in an open condition, they allow the pins 52 to be moved out of the cradles 50. Thus, the locking pins 52 and locking fingers 54 serve as locking means for releasably securing the tub 14 to the frame 12. It should be noted that the specific configuration of the saddle assemblies 46 and 48 is not a critical feature of the present invention as there are a wide variety of different types of saddle assemblies known in the art and the specific form of assembly shown herein is merely for purposes of illustration. Additionally, the locking pins 52 can be provided on the frame 12 and the locking fingers 54 can be provided on the tub 14 as an obvious alternative.

Figure 2:
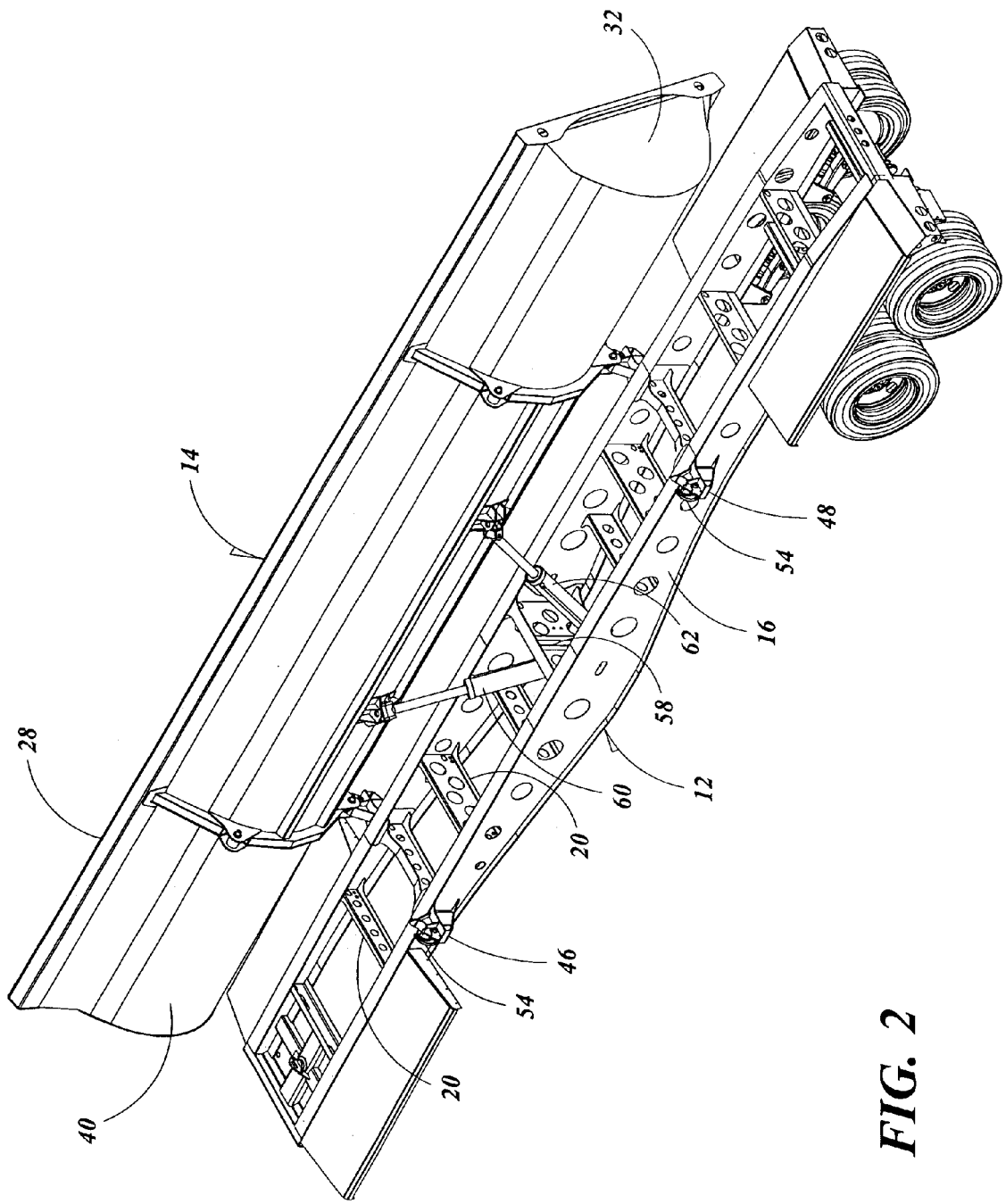
FIG. 2 is another perspective view of the embodiment of FIG. 1, but showing the containment tub being dumped.

As illustrated in FIG. 2, dumping of the containment tub 14 to either side of the frame 12 is accomplished by selecting the particular saddle assemblies 46 and 48 associated with the side of the tub body 28 that is opposite the side to which dumping is desired, and then moving the locking fingers 54 associated with such assemblies into an open condition to release the locking pins 52. By releasing the locking pins 52 on only one side of the tub 14 in such fashion, as the tub 14 is then raised it will pivot about the saddle assemblies 46 and 48 that remain in a closed condition so that the tub 14 will be pivoted onto its side and will dump the material it is carrying.

Figure 3:
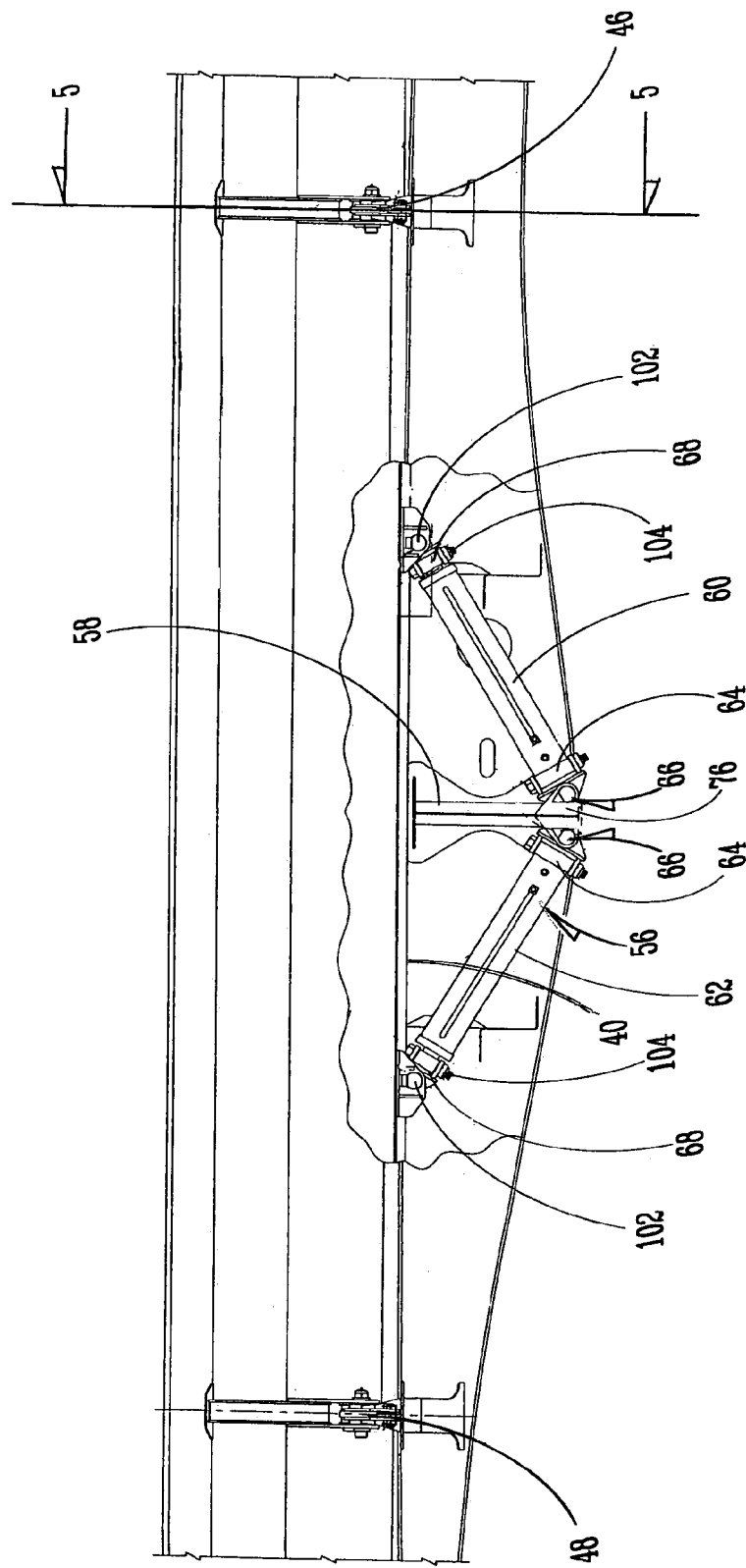
FIG. 3 is a side view of a cutoff portion of the embodiment of FIG. 1 and with portions of the trailer cut away to show a pair of power cylinders that form a lift system utilized for dumping of the containment tub.

To provide for lifting and pivoting of the containment tub 14 with respect to the frame 12, a lift system 56, as best shown in FIG. 3, is located beneath a generally medial portion of the containment tub 14. The life system 56 is formed of a pair of preferably hydraulically powered cylinders 60 and 62. As further illustrated in FIG. 3, a base end 64 of each of the cylinders 60 and 62 is secured to a centrally located support strut 58 of the trailer frame 12 by means of lower U-joint assemblies 66 associated with each of the base ends 64.

Figure 6:
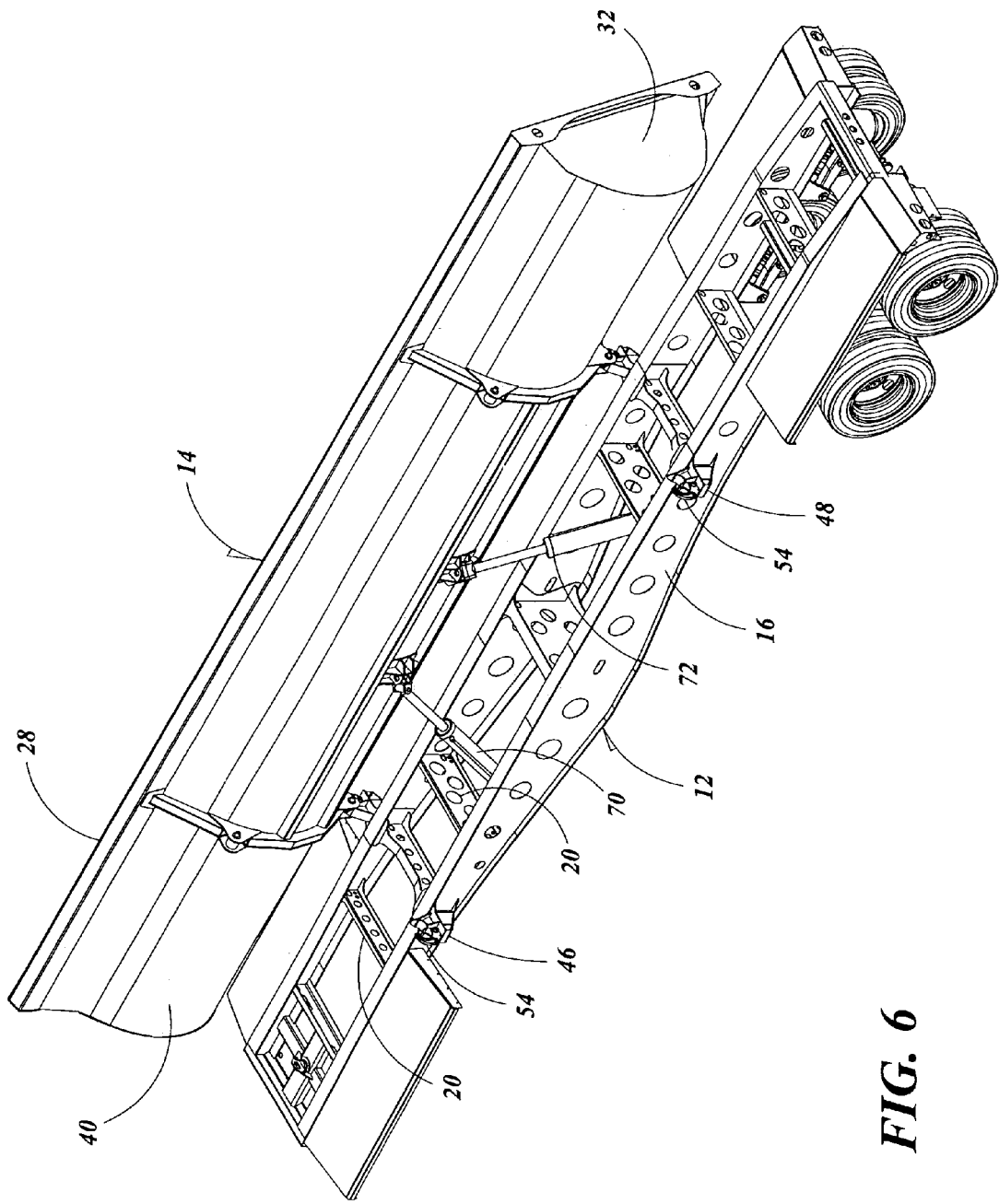
FIG. 6 is a perspective view similar to that of FIG. 2, but showing a modified embodiment to that of FIG. 1.

Each of the cylinders 60 and 62 is directed on an incline with respect to the frame 12 and containment tub 14, with the front cylinder 60 extending in a forwardly direction so that its ram end is attached to the tub bottom 40 by means of a first upper U-joint 68. Similarly, the rear cylinder 62 is positioned on an incline in a rearwardly direction to attach to the tub bottom 40 by a second upper U-joint 68. The use of the U-joints 66 and 68 is preferable to provide for optimum lifting of the container tub 14 in a fashion to accommodate the pivotal movement of the tub 14 with respect to the trailer frame 12. As is well-known, a U-joint is designed to provide for pivotal movement about two axes and the U-joints 66 and 68 are designed for this purpose. However, other types of connectors may also be used in place of the U-joints 66 and 68 so long as a sufficient pivotal freedom of movement is provided so that damaging twisting or tortional pressures between the cylinders 60 and 62 and the tub 14 are avoided. It should also be noted that the cylinders 60 and 62 do not have to be attached to the central support strut 58 and instead can be positioned away from such strut on either end of trailer frame 12. Furthermore it would also be possible to utilize two power cylinders 70 and 72 (see FIG. 6) that extend toward one another with their bases spaced further apart than are their attachment points to the tub 14.

Figure 4:
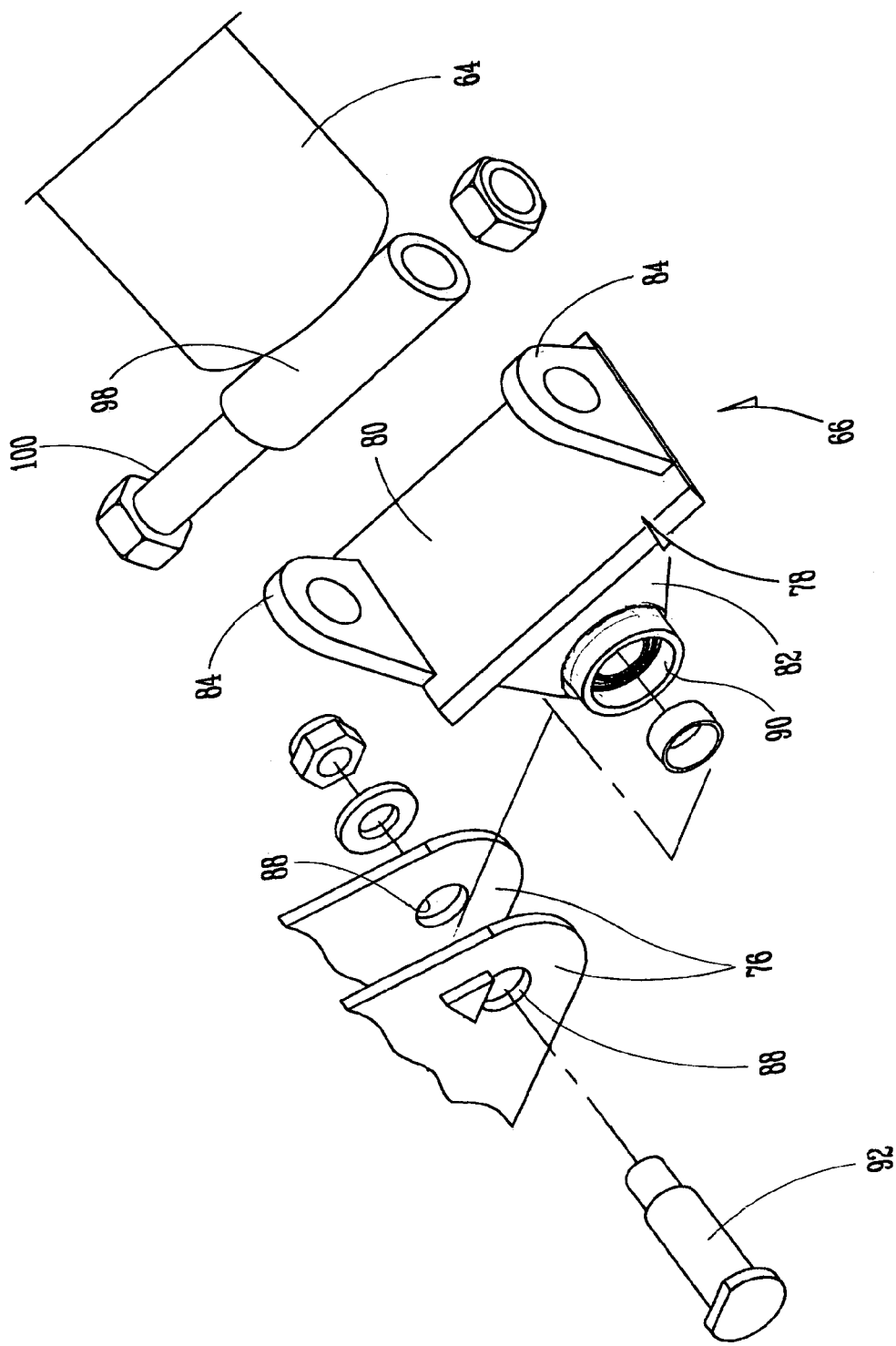
FIG. 4 is an exploded view in perspective of a universal joint assembly for attaching one end of one of the power cylinders to the frame.

As best shown in FIG. 4, each of the lower universal joint assemblies 66 is formed with brackets 76 that are secured to the central support strut 58 in a spaced apart relationship for receiving a lower cylinder yoke assembly 78. Included in the yoke assembly 78 is a head portion 80 with two wedge shaped spaced apart ears 82 extended from one side and with two spaced apart arms 84 extended from the opposite side.

Apertures 88 are formed in the brackets 76 and apertures 90 are formed in the yoke assembly ears 82 for receipt of a clevis pivot pin 92 to pivotally secure the ears 82 to the brackets 76 for rotational movement about the pin 92. Likewise, the base ends 64 of the cylinders 60 and 62 terminate in sleeves 98 that are sized to fit between the yoke assembly arms 84 and are connected thereto by bolts 100 to allow for pivotal movement of the cylinders 60 and 62 thereabout. In a similar fashion to the construction of the U-joints 66, the U-joints 68, include pivot pins 102 and bolts 104 about which pivotal movement is permitted between the ram ends of the cylinders 60 and 62 and the container tub 14.

It can thus be seen that the present invention, provides a bidirectional side dump trailer that improves on the prior art structures with a lift system positioned at opposite ends of the container tub or with a single lift system that is located at a point central of the tub. In contrast to such structures, the present invention provides an efficient and unique lift system for the container tub that-applies a lifting force at two different positions on the tub that are somewhat equally spaced apart along the tub bottom to avoid applying widely spaced apart torsional forces on the tub ends. Likewise, the utilization of two-points of contact for applying the lifting pressure on the tub divides up this pressure so that no one portion of the tub is exposed to the total lifting pressure.

The foregoing description of the present invention is solely for illustrative purposes only. It is to be understood that the terminology that has been used herein is intended to be in the nature of words of description rather than of limitation. Many modifications and variations of the present invention are possible in light of the above teachings. For example, there are many different alternatives for the construction of the container tub 14 or of the wheeled frame 12. Also, a variety of different types of U-joint constructions would as well be possible and the specific type of construction disclosed for the components of the present invention are only one example of the type of structures that could be utilized. Therefore, the foregoing description is not to be taken as definitive of the scope of the invention; but rather that which is regarded as the invention is set forth in the following claims.

What is claimed is:

1. A bidirectional side dump trailer comprising:
   (a) a wheeled frame having a forward end, a rearward end and opposite sides;
   (b) first and second forward tub supports mounted on the opposite sides of the front portion of said wheeled frame;
   (c) first and second rearward tub supports mounted on the opposite sides of the rear portion of said wheeled frame;
   (d) a containment tub for receiving material to be dumped and having an open top and front and rear end walls;
   (e) locking means mounted on opposite sides of said tub and said trailer for releasable securement of said tub to said frame;
   (f) tub lifting means comprised of at least two power cylinders having lower ends pivotally secured to portions of said trailer and upper ends pivotally secured to the bottom of said containment tub; and
   (g) said at least two power cylinders positioned at an inclined angle with respect to one another such that the upper ends of said cylinders are farther apart than the lower ends of said cylinders.

2. A side dump trailer as described in claim 1, wherein said power cylinders are positioned so that said power cylinders define a front power cylinder with a top end forward of the bottom end of said front cylinder and a rear power cylinder with a top end that is rearward of the bottom end of said rear cylinder.

3. A side dump trailer as described in claim 2, wherein said wheeled frame further includes a plurality of transverse support struts extending between the opposite sides of said frame, and whereby the bottom ends of said power cylinders are secured to at least one of said struts that is positioned generally medial of said frame.

4. A side dump trailer as described in claim 3, wherein said power cylinders are connected to said containment tub and said trailer by universal joints.

5. A side dump trailer as described in claim 4, wherein said locking means are associated with said forward and rearward tub supports and coact therewith for releasably securing said tub to said trailer.

6. A side dump trailer as described in claim 1, wherein said locking means are associated with said forward and rearward tub supports.

7. A side dump trailer as described in claim 6, wherein said locking means comprises locking pins mounted on one of the frame and containment tub and locking fingers mounted on the other of said frame and tub, wherein said fingers are pivotally movable from a closed condition securing said tub to said frame to an open condition allowing said tub to be moved with respect to said frame.

8. A side dump trailer as described in claim 7, wherein said power cylinders are positioned so that said power cylinders define a front power cylinder directed on an incline with respect to said frame and said tub in a forwardly direction and a rear power cylinder directed on an incline with respect to said tub and said frame in a rearwardly direction.

9. A side dump trailer as described in claim 1, wherein said power cylinders are in longitudinal alignment with one another with respect to said trailer and are located beneath said containment tub whereby said cylinders are in an inclined relationship with said tub and said trailer so that the lifting force applied by said cylinders on said tub has both vertical and horizontal components.

10. A bidirectional side dump trailer comprising:
    (a) a wheeled frame having a forward end, a rearward end and opposite sides;
    (b) first and second forward tub supports mounted on the opposite sides of the front portion of said wheeled frame;
    (c) first and second rearward tub supports mounted on the opposite sides of the rear portion of said wheeled frame;
    (d) a containment tub for receiving material to be dumped and having an open top and front and rear end walls;
    (e) locking means mounted on opposite sides of said tub and said trailer for releasable securement of said tub to said frame;
    (f) tub lifting means comprised of at least two power cylinders having lower ends pivotally secured to portions of said trailer and upper ends pivotally secured to the bottom of said containment tub; and
    (g) said power cylinders are positioned so that said power cylinders define a front power cylinder with a top end forward of the bottom end of said front cylinder and a rear power cylinder with a top end that is rearward of the bottom end of said rear cylinder.

11. A side dump trailer as described in claim 10, wherein said wheeled frame further includes a plurality of transverse support struts extending between the opposite sides of said frame, and whereby the bottom ends of said power cylinders are secured to at least one of said struts that is positioned generally medial of said frame.

12. A side dump trailer as described in claim 11, wherein said power cylinders are connected to said containment tub and said trailer by universal joints.

13. A side dump trailer as described in claim 12, wherein said locking means are associated with said forward and rearward tub supports and coact therewith for releasably securing said tub to said trailer.

14. A side dump trailer as described in claim 10 wherein said locking means are associated with said forward and rearward tub supports.

15. A side dump trailer as described in claim 14, wherein said locking means comprises locking pins mounted on one of the frame and containment tub and locking fingers mounted on the other of said frame and tub, wherein said fingers are pivotally movable from a closed condition securing said tub to said frame to an open condition allowing said tub to be moved with respect to said frame.

16. A side dump trailer as described in claim 15, wherein said front power cylinder is directed on an incline with respect to said frame and said tub in a forwardly direction and said rear power cylinder is directed on an incline with respect to said tub and said frame in a rearwardly direction.

17. A side dump trailer as described in claim 10, wherein said power cylinders are in longitudinal alignment with one another with respect to said trailer and are located beneath said containment tub whereby said cylinders are in an inclined relationship with said tub and said trailer so that the lifting force applied by said cylinders on said tub has both vertical and horizontal components.

18. A bidirectional side dump trailer comprising:
(a) a wheeled frame having a forward end, a rearward end and opposite sides;
(b) first and second forward tub supports mounted on the opposite sides of the front portion of said wheeled frame;
(c) first and second rearward tub supports mounted on the opposite sides of the rear portion of said wheeled frame;
(d) a containment tub for receiving material to be dumped and having an open top and front and rear end walls;
(e) locking means mounted on opposite sides of said tub and said trailer for releasable securement of said tub to said frame;
(f) tub lifting means comprised of at least two power cylinders having lower ends pivotally secured to portions of said trailer and upper ends pivotally secured to the bottom of said containment tub; and
(g) said power cylinders are in longitudinal alignment with one another with respect to said trailer and are located beneath said containment tub whereby said cylinders are in an inclined relationship with said tub and said trailer so that the lifting force applied by said cylinders on said tub has both vertical and horizontal components.

19. A side dump trailer as described in claim 18, wherein said power cylinders are positioned so that said power cylinders define a front power cylinder with a top end rearward of the bottom end of said front cylinder and a rear power cylinder with a top end that is forward of the bottom end of said rear cylinder.

* * * * *